April 14, 1925.
A. H. WADELL
1,533,152
PISTON
Filed March 7, 1921    2 Sheets-Sheet 1
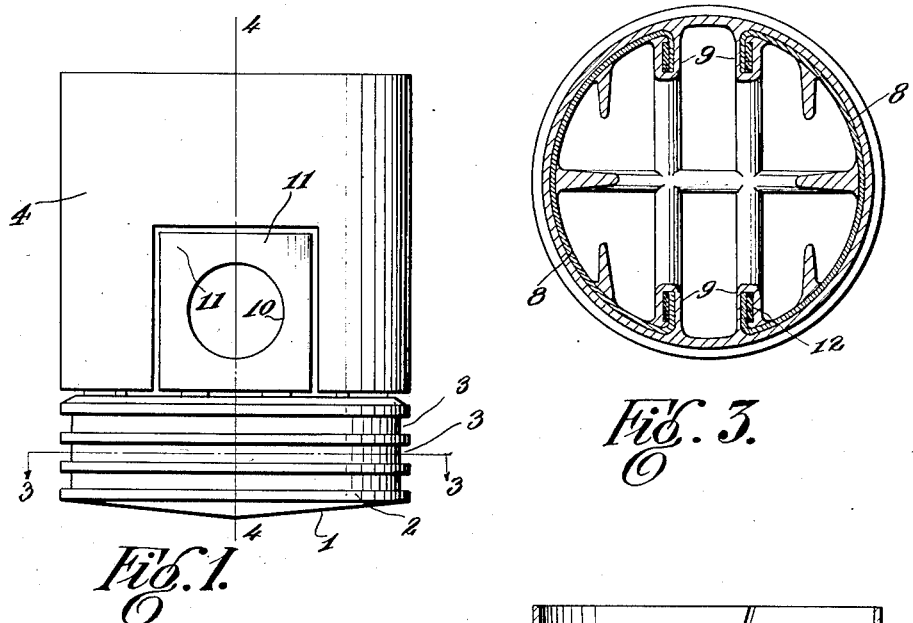
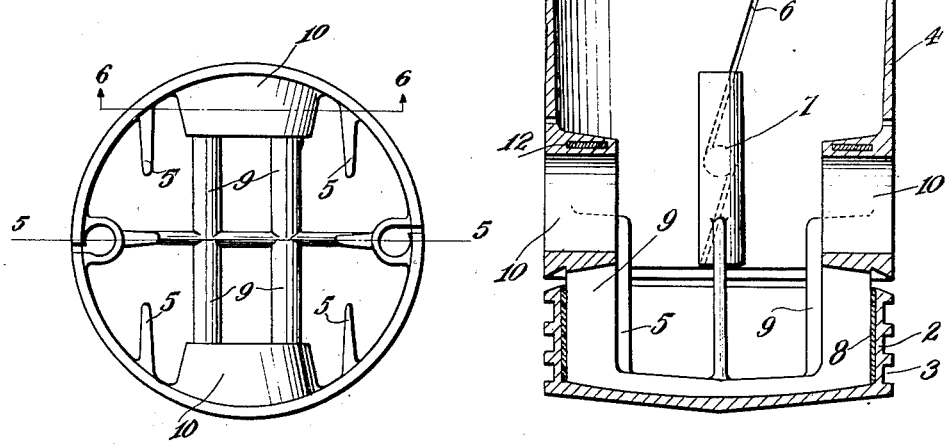
ALBERT H. WADELL
INVENTOR.
BY
Mason Fenwick & Lawrence
ATTORNEY.

April 14, 1925.  1,533,152
A. H. WADELL
PISTON
Filed March 7, 1921  2 Sheets-Sheet 2

ALBERT H. WADELL
INVENTOR.

BY
Mason Fenwick & Lawrence
ATTORNEYS

Patented Apr. 14, 1925.

1,533,152

UNITED STATES PATENT OFFICE.

ALBERT H. WADELL, OF NEWARK, NEW JERSEY.

PISTON.

Application filed March 7, 1921. Serial No. 450,225.

*To all whom it may concern:*

Be it known that I, ALBERT H. WADELL, a citizen of the United States, residing at Newark, in the county of Essex and State of New Jersey, have invented certain new and useful Improvements in Pistons; and I do hereby declare the following to be a full, clear, and exact description of the invention, such as will enable others skilled in the art to which it appertains to make and use the same.

This invention relates to new and useful improvements in the construction of pistons and more particularly to the type of pistons used in explosive engines or motors, the main object of the present invention being the provision of a piston wherein the skirt or guide portion of the piston is integrally connected with the head of the piston, but at the same time is movable with respect to the head portion to permit of free expansion and contraction of the piston whereby to prevent scoring of the cylinder by permitting the required expansion and contraction of the guide or skirt portion of the piston.

Another object of the present invention is the provision of a piston having a split skirt portion, integrally connected with the head of the piston, by suitable connecting ribs, which are arranged in detached position with respect to the ring wall of the head portion so as to permit the sections of the skirt or guide portion to contract and expand under various conditions whereby to prevent the scoring of the engine cylinders.

Another object of the invention is the provision of a piston wherein the body or the head of the piston is permitted to expand or contract under various conditions without causing any expansion on the part of the skirt or guide portion of the piston thus preventing scoring of the cylinders by the skirt of the piston and at the same time preventing leakage of oil past the piston skirt or guide as the latter does not expand with the body or the head of the piston yet remains in close contact with the cylinder wall at all times.

With the above and other objects in view the invention consists in the novel features of construction, combination and arrangement of parts hereinafter more fully set forth, pointed out in the claims and shown in the accompanying drawings in which:

Figure 1 is a side elevation of a piston constructed in accordance with my invention;

Fig. 2 is a top plan view;

Fig. 3 is a horizontal sectional view taken on the line 3—3 of Fig. 1;

Fig. 4 is a transverse sectional view taken on the line 4—4 of Fig. 1;

Figure 5:
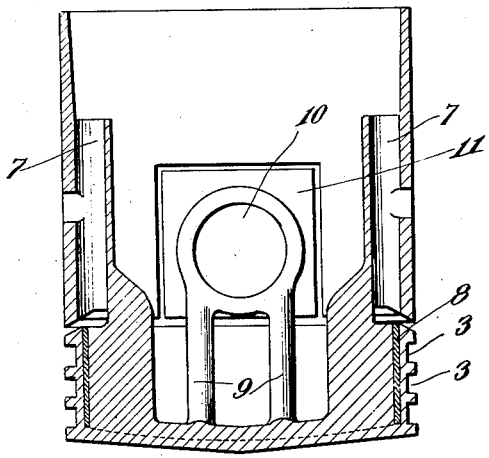
Fig. 5 is a transverse sectional view taken on the line 5—5 of Fig. 2.

The embodiment of my invention herein described and illustrated comprises a piston cast from an aluminum or other approved alloy suitable for pistons, said piston having a solid cup-like head, a divided or sectional expansible and contractible skirt portion circumferentially disconnected from the ring wall of the head, said skirt portion being normally of slightly greater diameter than the ring wall in order to have a nice sliding fit in the cylinder, while the space between the ring wall and cylinder is made fluid tight by elastic piston rings; and the mechanically contracted skirt portion is supported by carriers connected to the end portion of the piston head but not to the ring wall whereby the enlargment of the ring wall under heat will not necessarily compel the skirt to enlarge equally with it and thus bind the piston.

In the construction of my improved piston, the cup-like head is formed in a single piece, that is, the end 1 and the side wall portion 2 are formed integral, the side wall portion 2 being provided with the usual annular grooves 3 for the reception of the packing rings.

The skirt or guide portion of the piston generally indicated by the numeral 4 is preferably formed of two separate sections circumferentially disconnected from the side wall, each section being joined to the end portion 1 of the head of the piston by means of the skirt carriers 5, each of said skirt carriers having one end integrally formed with the sections of the skirt portion 4 and the other end integrally formed with the end portion 1 of the piston head. Suitable space is provided between the two sections of the skirt as shown at 6 to provide for the contraction or expansion of the skirt under mechanical pressure, said space being arranged on a diagonal with respect to the body portion of the skirt to lessen the chances of the scoring of the cylinder. These two sections are connected together by means of the hood portion or inwardly curved web 7, the longitudinal edges of which are connected to the opposed edges of the sections of the skirt and are expansible to a certain extent to permit of the proper amount of movement of the two sections of the skirt to accommodate the necessary contraction and expansion. It will be noted that certain of the skirt carriers 5 are connected integrally with the hood portions 7 at one end and the other end integrally connected with the end portion 1 of the head of the piston.

I am well aware of the fact that pistons have been constructed heretofore with the head and skirt or guide portion formed in spaced relation with each other so that the conduction or transmission of heat from the head to the body or guide portion of the piston is reduced to a minimum and also the construction of a split skirt or guide portion arranged in spaced relation with the head portion of the piston to permit of contraction and expansion to prevent scoring of the cylinder. The main object of my invention lies in the fact that in the construction of my improved piston, the carriers or ribs 5 which connect the skirt or guide portion to the head of the piston do not connect to the wall portion 2 of the piston head but connect only to the end portion 1 so that during the contraction and expansion of the body or head of the piston, there is no expansion conveyed to the skirt or guide portion of the piston thus eliminating scored cylinders and preventing the piston from freezing to the cylinder wall.

In order to provide for the contraction and expansion of the body or head portion of the piston without permitting the same to extend to the skirt or guide portion thereof I make the piston of an approved alloy and cast between the skirt carriers 5 and the wall portion 2 a strip 8 of a metal such as steel, having a lower coefficient of expansion than the alloy of the piston head, said strip separating the ribs and the wall portion 2, whereby there is permitted a slight radial movement or inward flexing on the part of the ribs or carriers with respect to the wall portion; the steel strip being fastened to the body portion of the ribs 9 and the expansion of the head creating a tension on the cast-in steel strip 8 the skirt portion of the piston is prevented from expanding with the head portion and said skirt retains its nicety of fit in the cylinder guide portion of the piston without, however, contracting sufficiently to permit oil to pass through the piston skirt.

Figure 6:
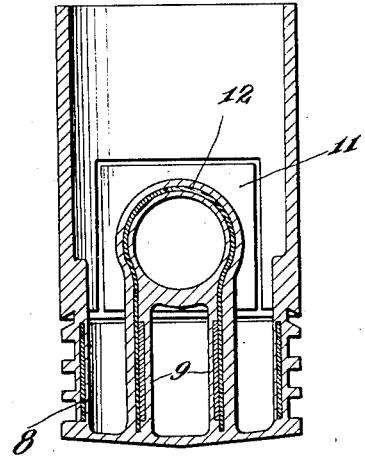
Fig. 6 is a detail sectional view taken on the line 6—6 of Fig. 2.
Figure 7:
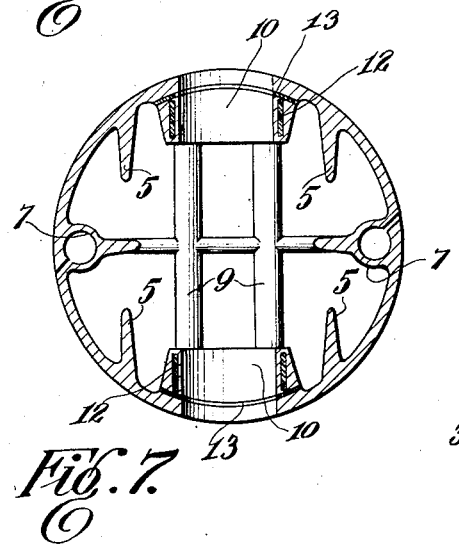
Fig. 7 is a horizontal sectional view illustrating a modified construction with respect to the wrist pin bearings.
Figure 8:
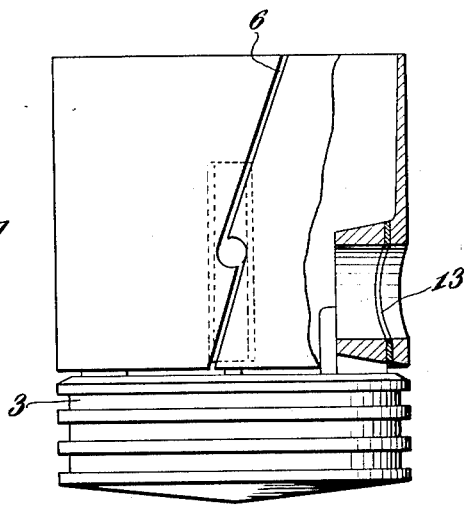
Fig. 8 is a side elevation, parts thereof being broken away and illustrated in section to disclose how the wrist pin bearings can be constructed separate from the skirt or guide portion.

In order to complete the contour of the skirt or guide portion of the piston, the wrist pin bearings 10 are provided with a curved plate portion 11 adapted to provide a continuation of the skirt or guide portion adjacent the bearings 10, but it will be noted that this plate portion 11 is not connected with the skirt or guide portion and thus does not interfere with the contraction and expansion of the skirt or guide portion of the piston. In order to lend additional strength to the wrist pin guides 10, a steel strip is cast within the ribs 9 and the bearing 10 in the form of a core as shown at 12 and extends into the ribs to a point adjacent the end portion 1 of the piston head as clearly illustrated in Figure 6. This bearing portion 10, however, can be formed separable from the skirt or guide portion 4 so as to eliminate the necessity of the extra plate portion 11 to complete the contour of the exterior of the skirt portion and in order to accomplish this, a steel plate 13 is inserted between the bearing portion 10 and the ribs 9 and the inner wall of the skirt or guide portion 4, during the molding of the same so that after the molding operation has been completed, this plate 13 can be removed so that there will be no connection whatever between the wrist pin bearings 10 and the skirt or guide portion 4. This feature is clearly illustrated in Figs. 7 and 8.

From the above description taken in connection with the accompanying drawings it will be readily apparent that I have provided a piston wherein the skirt portion while integrally connected with the piston head, is not connected to the wall portion of the head which supports the packing rings and wrist pin bosses and that thus the head portion and wrist pin bosses are permitted to contract and expand without conveying such expansion to the skirt or guide portion of the piston; this construction allows the use of stationary or floating wrist pins and does not cause expansion of the skirt or guide wall as the body or head of the piston expands from heat thus positively preventing scoring of cylinders.

While I have shown and described certain details of construction in my improved piston, I wish it to be understod that I am not to be limited to these specific details, but desire to make such changes and alterations as fall within the scope of the claims appended hereto.

I claim:

1. A piston of the class described including a head comprising an end portion and wall portion, an expansible skirt portion, rib members integrally connecting the skirt portion with the end portion of the head and a steel band disposed between the ribs and the wall portion of the head.

2. A piston of the class described including a head comprising an end portion and wall portion, a sectional skirt portion, hood members connecting the sections of said skirt portion, rib members integrally connecting the sections of the skirt with the end of the head-member and a metal band disposed between the ribs and the wall portion of the head whereby there is permitted contraction of the skirt, caused by the expansion of the head creating a tension on the cast-in steel strip.

3. A piston of the class described comprising a head having an end portion and a wall portion, a skirt circumferentially spaced from the wall portion and divided from end to end, carriers connecting the skirt portion with the end portion of the head, said carriers being disconnected from the wall portion of said head, wrist pin bearings arranged between the ends of the skirt portion and integrally connected with the wall and end portions of the head, said bearings being spaced from the skirt portion, and having their end surfaces cylindrically curved corresponding to the curve of the said wall portion.

4. A piston of the class described including a head member comprising an end portion and a wall portion, a sectional skirt portion, means connecting the skirt portion with the end portion of the head, bearings arranged within the skirt portion and integrally connected with the end portion of the head and a metal band having its ends embedded within the connecting means of the bearings and extending between the connecting means of the skirt portion and the wall portion of the head.

5. A piston of the class described including a head member comprising an end portion and a wall portion, a sectional skirt member, means connecting the sections of said skirt portion whereby to permit contraction and expansion of the sections, means integrally connecting the sections of the skirt with the end of the head, bearing members separably arranged within the skirt portion, means connecting the bearing with the end of the head member and a metal band inserted between the connecting means of the skirt, bearings and end of the head member and the wall portion of the head member.

6. In a piston of the class described, a cup-like head comprising a pressure receiving end and a ring wall portion, a skirt portion circumferentially disconnected from the ring wall portion and divided from end to end, skirt carriers connecting the skirt portion to the pressure receiving end of said head, said skirt carriers being disconnected from the wall portion of the head, and means for resisting the expansive movement of the carriers in order to prevent the skirt from expanding in the same proportion as the cup-like head.

7. In a piston of the class described, a head, a skirt portion circumferentially disconnected from the head and divided from end to end, skirt carriers, susceptible of being slightly flexed radially, connecting said skirt to the head, and an inwardly curved hood or web connecting the adjacent edges of the divided skirt and bridging the dividing space whereby the skirt may be expanded to compensate for wear.

8. A piston comprising a head having wrist-pin bearings at opposite sides, a skirt separated therefrom by a continuous, transverse slit extending for a portion of its length below said wrist-pin bearings, and means for connecting said skirt with said head.

In testimony whereof I affix my signature.

ALBERT H. WADELL.